United States Patent
Westre et al.

(10) Patent No.: US 7,192,501 B2
(45) Date of Patent: Mar. 20, 2007

(54) METHOD FOR IMPROVING CRACK RESISTANCE IN FIBER-METAL-LAMINATE STRUCTURES

(75) Inventors: Willard N. Westre, Bellevue, WA (US); Leanna M. Micona, Seattle, WA (US); Earl E. Van Beek, Seattle, WA (US)

(73) Assignee: The Boeing Company, Chicago, IL (US)

( * ) Notice: Subject to any disclaimer, the term of this patent is extended or adjusted under 35 U.S.C. 154(b) by 376 days.

(21) Appl. No.: 10/283,546

(22) Filed: Oct. 29, 2002

(65) Prior Publication Data

US 2004/0081849 A1 Apr. 29, 2004

(51) Int. Cl.
*B24B 1/00* (2006.01)

(52) U.S. Cl. .................................. 156/219; 72/53

(58) Field of Classification Search ............... 156/160; 72/53, 40, 334, 412; 428/213, 246, 216, 428/252
See application file for complete search history.

(56) References Cited

U.S. PATENT DOCUMENTS

| | | | |
|---|---|---|---|
| 2,701,408 A | | 2/1955 | Borger |
| 3,705,510 A | | 12/1972 | Baughman |
| 3,857,750 A | * | 12/1974 | Winter et al. ............... 428/66.7 |
| 4,489,123 A | | 12/1984 | Schijve et al. |
| 4,500,589 A | * | 2/1985 | Schijve et al. ............... 428/213 |
| 4,969,593 A | * | 11/1990 | Kennedy et al. ............ 148/535 |
| 4,992,323 A | * | 2/1991 | Vogelesang et al. ........ 428/215 |
| 5,039,571 A | * | 8/1991 | Vogelesang et al. ........ 428/213 |
| 5,415,336 A | * | 5/1995 | Stenard et al. .............. 228/193 |
| 5,578,384 A | * | 11/1996 | Kingston ..................... 428/608 |
| 5,816,088 A | * | 10/1998 | Yamada et al. ................ 72/53 |
| 5,849,110 A | * | 12/1998 | Blohowiak et al. ......... 148/247 |
| 6,038,900 A | * | 3/2000 | Miyasaka ...................... 72/53 |
| 6,345,083 B1 | | 2/2002 | Enomoto et al. |

FOREIGN PATENT DOCUMENTS

| | | |
|---|---|---|
| EP | 0 323 660 A1 | 7/1989 |
| EP | 0 312 150 B1 | 12/1992 |
| EP | 0 783 960 A2 | 7/1997 |
| EP | 1 094 131 A2 | 4/2001 |
| WO | WO 98/09750 A1 | 3/1998 |

OTHER PUBLICATIONS

Everett et al. The Effects of Shot and Laser Peening on Fatigue Life and Crack Growth in 2024 Aluminum Alloy and 4340 Steel. U.S. Army Research Laboratory, Langley Research Center, Hampton, VA. Dec. 2001.*

* cited by examiner

*Primary Examiner*—Richard Crispino
*Assistant Examiner*—Christopher T. Schatz
(74) *Attorney, Agent, or Firm*—Lee & Hayes, PLLC

(57) ABSTRACT

A method is provided for altering residual stresses in a fiber-metal-laminate structure. At least a first fiber laminate substrate layer having first and second surfaces is provided. At least a first outer metallic laminate layer having third and fourth surfaces is provided, and the first and fourth surface is provided, and the first and fourth surfaces are bonded together. The third surface is peened, such that the at least first fiber laminate substrate layer is subjected to residual tensile stresses and the at least first outer metallic laminate layer is subjected to residual compression stresses. Peening defines a peened region that extends from the third surface into the at least first outer metallic laminate layer a finite distance that is closer to the third surface than the fourth surface.

12 Claims, 3 Drawing Sheets

METHOD FOR IMPROVING CRACK RESISTANCE IN FIBER-METAL-LAMINATE STRUCTURES

FIELD OF THE INVENTION

This invention relates generally to methods for delaying onset of crack initiation and, more specifically, to methods for delaying onset of crack initiation in laminate structures.

BACKGROUND OF THE INVENTION

Fiber-metal-laminate structures are becoming an increasingly popular material choice where strength or weight, or both strength and weight, are taken into consideration. For example, fiber-metal-laminates are used in the aircraft and automotive industries as lightweight and high-strength alternatives to non-laminate structures.

Generally, a laminate structure having an outer laminate layer that is resistant to failure is preferred as an exterior layer. This is because the outer laminate layer protects the inner laminate layers and the bond layers from potentially harmful elements that may cause laminate structure failure, as well as providing an aesthetically pleasing surface. However, the generally thin nature of the laminate layers creates difficulties in maintaining the integrity of the outer laminate layer. Referring to FIGS. 1A and 1B, untreated outer metal laminate layers of fiber-metal-laminate structures are subject to residual tension stresses. Referring to FIG. 1A, before high temperature curing, an outer metal laminate layer 5 has an initial length l, and an inner laminate layer 7 has an initial length $l_2$. Referring now to FIG. 1B, after cooling down from high temperature curing, the outer metal laminate layer 5 has a final length $l_3$ that is longer than the initial length $l_1$, and the inner laminate layer 7 has the final length $l_3$ that is shorter than the initial length $l_2$. As a result, the outer metal laminate layer 5 is subject to residual tension stresses that can contribute to the onset of crack initiation. For example, if the onset of crack initiation occurs at 40 KSI and the outer metal laminate layer 5 is subject to residual tension stresses of, for example, 20 KSI, then onset of crack initiation occurs at a lower stress level (in this example, at 20 KSI instead of 40 KSI) or at a reduced number of fatigue cycles at a given stress level.

Thus, fatigue life at an existing stress level is shortened when the outer metal laminate layer is subject to residual tension stresses. Alternately, for a finite fatigue life of a set number of fatigue cycles, a lower stress causes the onset of crack initiation as discussed above.

One current approach to enabling a fiber-metal-laminate structure to withstand greater stresses is to increase the amount of the structure. However, such an approach can become costly. Further, increasing the amount of structure adds weight to the structure and can offset weight advantages inherent in use of fiber-metal-laminate structures, especially in applications such as aerospace applications in which weight savings are advantageous.

Another current approach to enabling a fiber-metal-laminate structure to withstand greater stresses is to pre-stress the laminate structure. The entire laminate structure is generally subjected to a pre-stress that is designed to stretch the outer metal laminate layers past their yield point to reduce or eliminate residual tension stresses in order to delay the onset of crack initiation in the outer laminate layers. However, this process is employable only in sheet-type laminate structures and not with a laminate structure having a more complex geometry.

Therefore, there exists an unmet need in the art for decreasing the onset of crack initiation of fiber-metal-laminate materials of any geometry without adding structure or pre-stressing entire laminate structures.

SUMMARY OF THE INVENTION

The present invention delays the onset of crack initiation in fiber-metal-laminate structures by subjecting outer metallic laminate layers to residual compressive stresses and subjecting fiber laminate substrate layers to residual tensile stresses. If desired, the present invention can advantageously be used in selected regions of a structure, such as without limitation a structure with complex geometry. Or, if desired, the present invention can be used in an entire structure, regardless of geometry of the structure. As a result, the present invention avoids disruptions and costs that are incurred by currently-known techniques by removing a part from a continuous line process for treatment to increase fatigue life.

According to one embodiment of the invention, a method is provided for altering residual stresses in a fiber-metal-laminate structure. At least a first fiber laminate substrate layer having first and second surfaces is provided. At least a first outer metallic laminate layer having third and fourth surfaces is provided, and the first and fourth surfaces are bonded together. The third surface is peened, such that the at least first fiber laminate substrate layer is subjected to residual tensile stresses and the at least first outer metallic laminate layer is subjected to residual compression stresses. Peening defines a peened region that extends from the third surface into the at least first outer metallic laminate layer a finite distance that is closer to the third surface than the fourth surface.

According to another embodiment of the invention, a fiber-metal-laminate structure is provided. At least a first fiber laminate substrate has a first surface and a second surface. At least a first outer metallic laminate layer has a third surface and a fourth surface, and the fourth surface is bonded to the first surface. The at least first outer metallic layer defines a peened region that extends from the third surface into the at least first outer metallic laminate layer a finite distance that is closer to the third surface than the fourth surface. The at least first fiber laminate substrate layer is subjected to residual tensile stresses and the at least first outer metallic laminate layer is subjected to residual compression stresses. According to one aspect of the invention, the peened region may be defined in a selected section of the third surface. Alternatively, according to another aspect of the invention, the peened region may be defined in substantially all of the third surface.

BRIEF DESCRIPTION OF THE DRAWINGS

The preferred and alternative embodiments of the present invention are described in detail below with reference to the following drawings.

DETAILED DESCRIPTION OF THE INVENTION

Figure 1A:
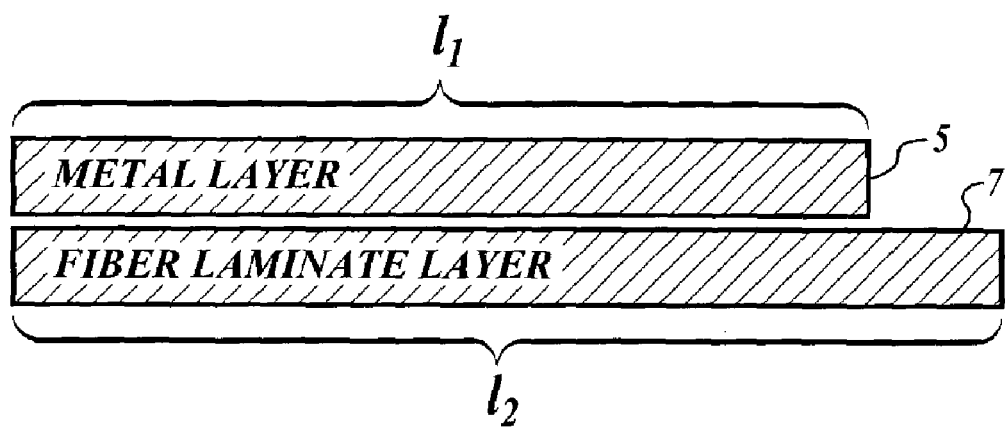
FIGS. 1A and 1B are exploded side views of prior art laminate structures before and after curing, respectively.
Figure 1B:
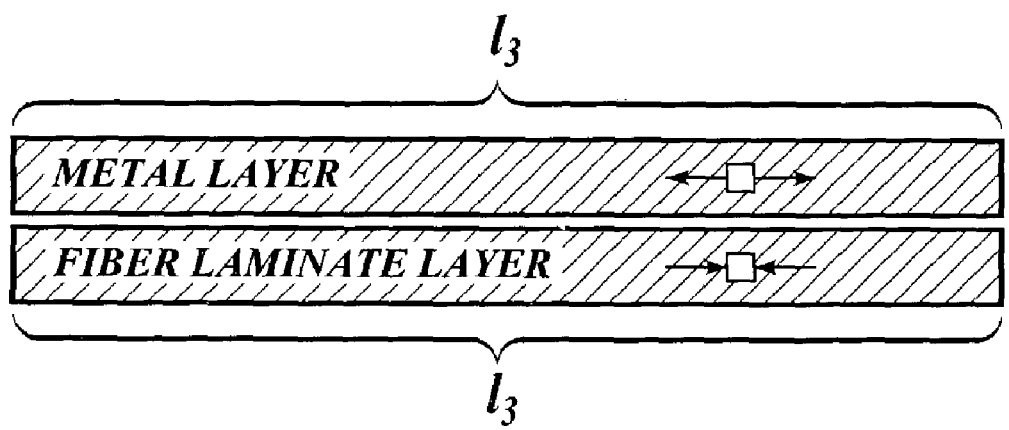

The present invention provides a method for delaying onset of crack initiation in fiber-metal-laminate structures and a fiber-metal-laminate structure that has increased resistance to crack initiation regardless of complexity of the structure's geometry. Advantageously, the present invention causes outer metallic layers of the structure to be subjected to residual compression stresses and the fiber substrate layers to be subjected to residual tensile stresses. In one present embodiment, peening the outer metallic layers induces the residual stresses in the outer metallic layers and the substrate layers. By way of overview and with reference to FIG. 2, one non-limiting embodiment of the present invention provides a fiber-metal-laminate structure 22 that includes a plurality of fiber laminate substrate layers 30 that define a first surface 32 and a second surface 34. A first outer metallic laminate layer 24 has a third surface 26 and a fourth surface 28 that is bonded to the first surface 32, and a second outer metallic laminate layer 25 has a fifth surface 27 that is bonded to the second surface 34 and a sixth surface 29. A shot device 38 controllably forces shot 36 into the first and second outer metallic laminate layers 24 and 25 to define first and second peened regions 40 and 41. The first peened region 40 extends from the third surface 26 into the first outer metallic laminate layer 24 a first finite distance that is closer to the third surface 26 than the fourth surface 28, and the second peened region 41 extends from the sixth surface 29 into the second outer metallic laminate layer 25 and a second finite distance that is closer to the sixth surface 29 than the fifth surface 27. The plurality of fiber laminate substrate layers 30 are subjected to residual tensile stresses and the first and second outer metallic laminate layers 24 and 25 are subjected to residual compression stresses. Specific details are described with more particularity below.

The fiber-metal-laminate structure 22 is suitably either Aluminum-based or non-Aluminum based. In one presently preferred embodiment, the metallic laminate layers 24 and 25 include Titanium. More specifically, the metallic laminate layers 24 and 25 are suitably a 2Ti-8C-4C-2C lay-up, a 4Ti-2C-1C lay-up, or preferably a Ti-15-3-3-3 Titanium However, other metallic laminate layers 24 and 25 include other metallic members that are considered within the scope of this invention, such as, without limitation, Aluminum. Additionally, it will be appreciated that other Titanium alloys as well as other metals and metal alloys may be used without departing from the spirit of this invention. Suitable thicknesses of the metallic laminate layers 24 and 25 are between around 0.005 inches and around 0.020 inches. One presently preferred embodiment uses metallic laminate layers having a thickness of around 0.005 inches. However, it will be appreciated that any thickness can be used as desired for a particular application.

In one presently preferred embodiment, when Titanium is used, the fiber laminate layers 30 suitably include a graphite fiber such as a Toray P2302-19 pre-preg material. However, it will be appreciated that any other fiber layer is considered within the scope of this invention. Examples of other acceptable fiber layers include graphite with Boron (used when the metallic laminate layers 24 and 25 include Titanium). When Aluminum is used in the metallic laminate layers 24 and 25, acceptable fiber layers include glass fiber as in GLARE™ and Kevlar fiber as in ARALL. Suitable thicknesses of the metallic laminate layers 24 and 25 are between around 0.012 inches and around 0.002 inches. However, it will be appreciated that any thickness can be used as desired for a particular application.

If desired, a bonding layer 42 may be provided between the plurality of the fiber laminate substrate layers 30. Further, if desired, the bond layer may be provided between the fiber laminate substrate layers 30 and the first and second outer metallic laminate layers 24 and 25. When the bond layer 42 is provided, a surface preparation 43, such as without limitation a Sol Gel surface preparation, is applied to the fourth and fifth surfaces 28 and 27. The bond layer 42 preferably includes an epoxy-based adhesive. In one non-limiting example, the bond layer 42 is suitably a thin, uniform layer of epoxy adhesive. However, it will be appreciated that other epoxy-based primers or other adhesive materials are considered within the scope of this invention, such as, without limitation, Metlbond 1515-3M produced by Cytec Engineered Materials, Inc.

Any number of the metallic laminate layers 24 and 25 and the fiber laminate layers 30 may be used to create the fiber-metal-laminate structure 22. It will be appreciated that, if desired, additional metallic laminate layers may be interposed between the fiber laminate substrate layers 30.

In one presently preferred embodiment, a shot intensity within a range of about 0.004 to about 0.020 as measured on an appropriate portion of the Almen A-Scale of peening intensity. The Almen scale has been found to provide acceptable peening for surface gages of approximately around 0.005 inches or less, and is considered to be within the scope of this invention. It will be appreciated, however, that the optimal shot intensity may deviate from the preferred intensity depending upon the processes employed to peen the third and sixth surfaces 26 and 29 of the metallic laminate layers 24 and 25, the thickness of the metallic laminate layers 24 and 25 that are peened, or the material used in the metallic laminate layer 24 that is peened. Thus, a shot intensity above or below the range described above is considered to be within the scope of this invention.

The intensity at which the shot 36 is transmitted is dependent upon the nature of the fiber-metal-laminate structure 22. That is, when thicker outer metallic laminate layers 24 and 25 are used, a higher shot intensity may be used. A higher shot intensity may also be needed when using harder materials for the metallic laminate layer 24 and 25. Conversely, a lower shot intensity may be used if thinner and softer outer metallic laminate layers 24 and 25 are used.

Figure 2:
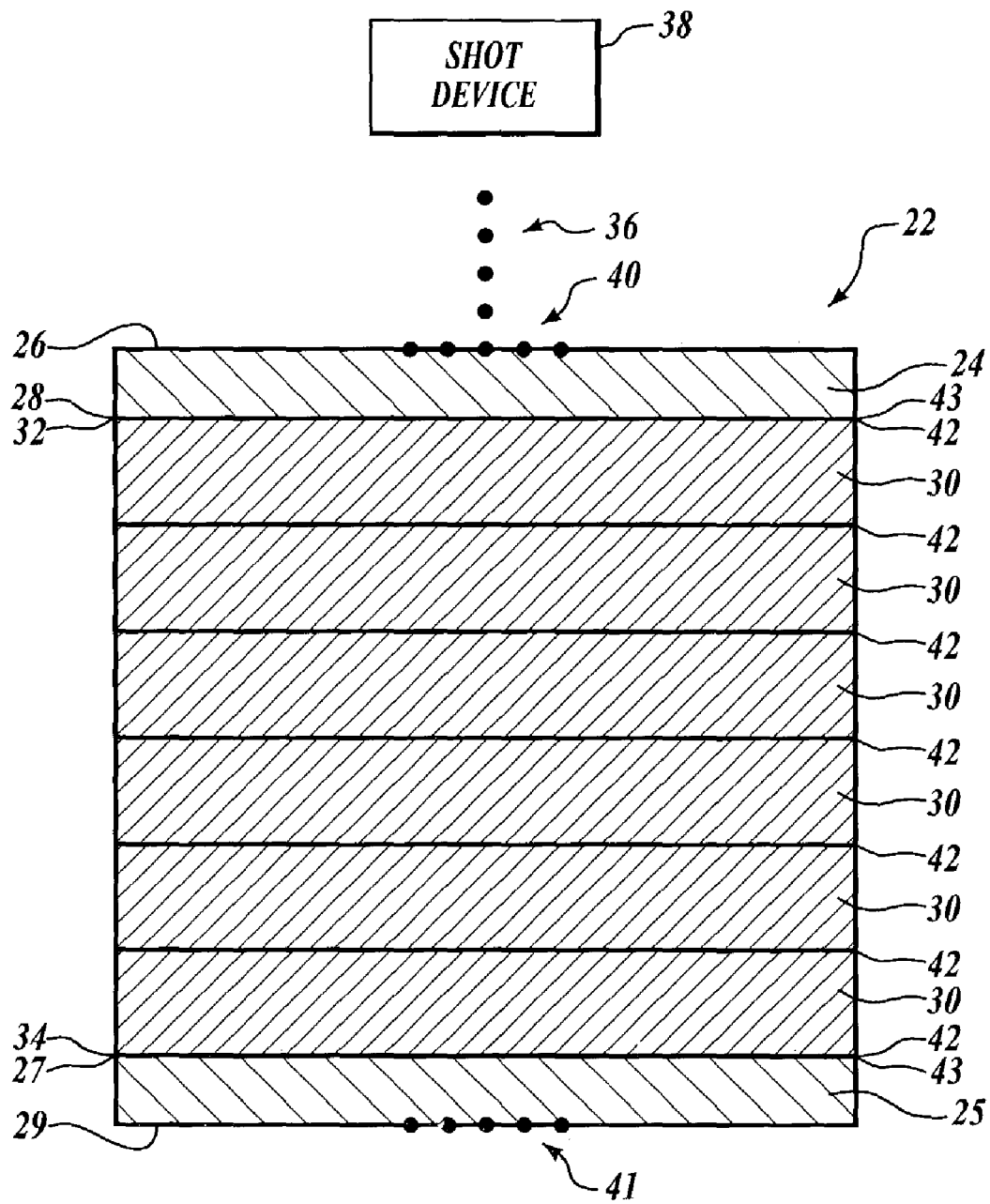
FIG. 2 is an exploded side view partially in schematic form of the present invention.

When the shot 36 is transmitted at an intensity within the disclosed range, a peened region 40 has been found to be created in the outer-most metallic laminate layers 24 and 25 of the fiber-metal-laminate structure 22 without disrupting any interior layers, including any of the bond layers 42 or the fiber laminate layers 30. The shot 36 advantageously does not travel completely through the outer-most metallic laminate layers 24 and 25 and exit via the fourth or fifth surfaces 28 and 27. Preferably, the peened regions 40 extend into the metallic laminate layers 24 and 25 barely past the third and sixth surfaces 26 and 29. Thus, it will be appreciated that FIG. 2 is not drawn to scale. Further, the shot 36 does not produce extrusions, bumps, disruptions, or the like, that extend onto the third or fifth surfaces 28 and 27 and that may interfere with or disrupt the bond layer 42. That is, the peened regions 40 and 41 are limited to the outer-most metallic laminate layers 24 and 25.

The peened regions 40 and 41 cause the outer metallic laminate layers 24 and 25 to be subjected to residual compressive stresses. The shot 36 is forced into the outer metallic laminate layers 24 and 25. It will be appreciated that impinging shot 36 onto the surface of the outer metallic layers 24 and 25 creates small indentations on the outer metallic layers 24 and 25, thereby causing the outer metallic layers 24 and 25 to grow or stretch. The stretching of the outer metallic laminate layers 24 and 25 tends to stretch, to a lesser extent, the fiber laminate layers 30 that are attached to the outer metallic laminate layers 24 and 25. As a result, the fiber laminate layers 30 are subjected to residual tensile stresses. Advantageously, the fiber laminate layers 30 do not stretch as much as the outer metallic laminate layers 24 and 25 because the cumulative thickness of the fiber layers 30 is large in relation to the metallic out layers 24 and 25. Because the fiber laminate layers 24 stretch less than the outer metallic laminate layers, the fiber laminate layers 30 tend to restrain or mitigate growth or stretching of the outer metallic laminate layers 24 and 25 that are being peened. Advantageously, restraint or mitigation of growth or stretching of the outer metallic laminate layers 24 and 25 prevents the outer metallic laminate layers 24 and 25 from growing or stretching so much that they are subject to residual tensile stresses. Instead, restraint or mitigation by the fiber laminate layers 30 of growth or stretching of the outer metallic laminate layers 24 and 25 maintains residual stresses of the outer metallic laminate layers 24 and 25 in compression. By being subjected to residual compressive stresses, according to the present invention the outer metallic laminate layers 24 and 25 advantageously are able to withstand higher stresses or an increased number of fatigue cycles before the onset of crack initiation.

The shot 36 is driven by a shot device 38. The shot device 38 is any acceptable shot peening device known in the art that can produce the peened regions 40 and 41 having the desired results as described above. Suitable examples of the shot device 38 include the BCP 96130 Autoblast Monorail, BCP 8496 Monorail, BCP Pass Thru Autoblast® Wheelabrator WMT-48A, Wheelabrator WMT-60A, Wheelabrator-84A, BCP® Double-Door 60" Swing Table Machine (all available from U.S. Surface Preparation Group), or the like.

In a presently preferred embodiment, the shot 36 suitably includes steel shot. However, in other embodiments, other shot materials are suitably used. Non-limiting examples of other acceptable shot materials include glass shot, wire loop, and sand. Additionally, other traditional and non-traditional mediums for shot peening are also suitably used, such as, without limitation, water and laser. Other traditional and non-traditional mediums suitably include ice, ceramics, plastics, other metals, and organic materials. In addition, another suitable medium includes cryogens, such as without limitation cryogenic gases that evaporate after peening the outer metallic laminate layers 24 and 25.

In one presently preferred embodiment, the peened regions 40 and 41 of the fiber-metal-laminate structure 42 are used in sections of the fiber-metal-laminate structure 22 having complex geometry or surface variations, such as holes or ridges. In this manner, these typically higher-stress regions receive the benefits afforded by the present invention while mitigating increases in production time. However, it will be appreciated that the invention may be employed over an entire fiber-metal-laminate surface or only in selected regions as desired for a particular application.

Figure 3:
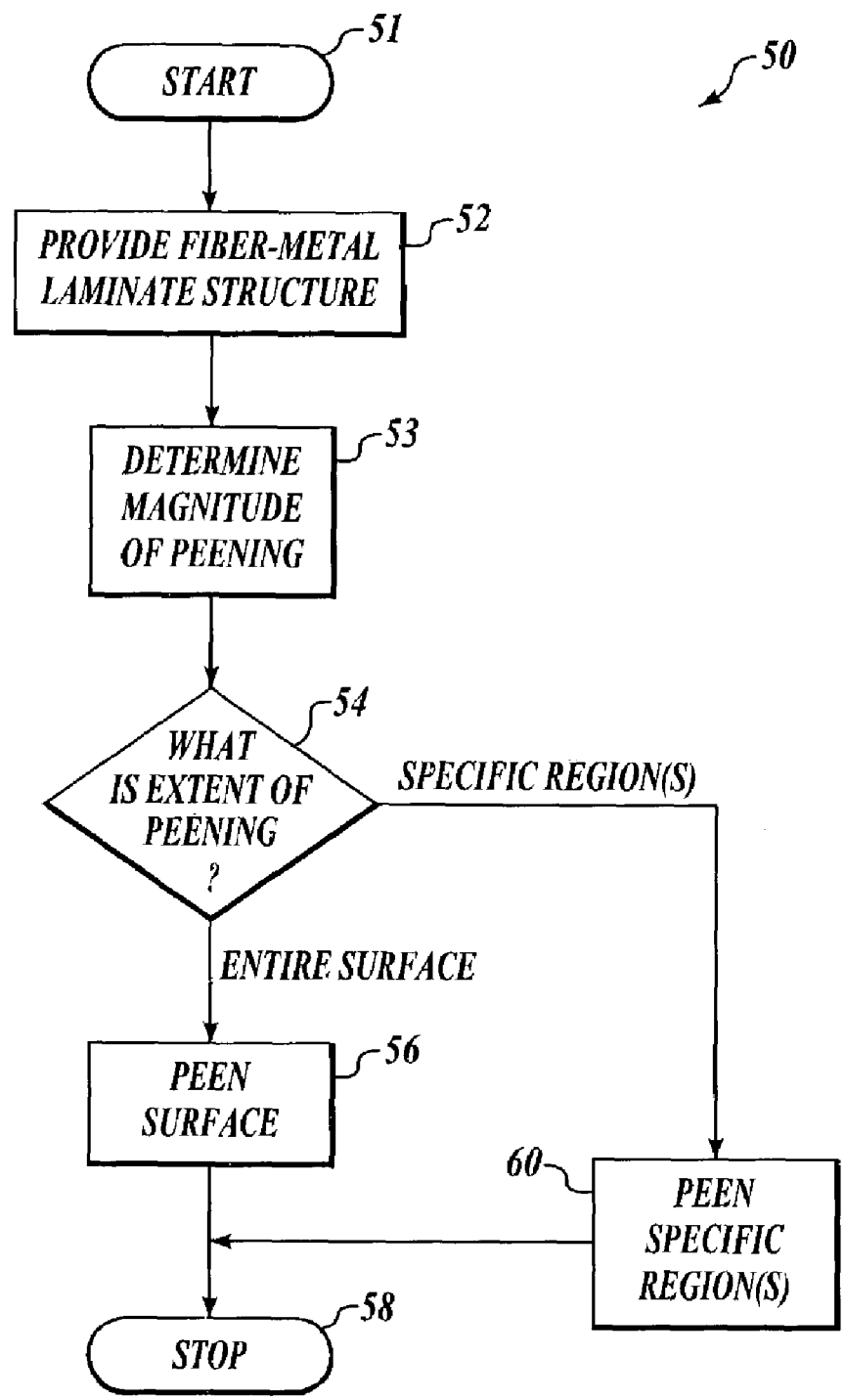
FIG. 3 is a flow chart of a peening method according to the invention.

Referring now to FIG. 3, a peening method 50 starts at a block 51. A fiber-metal-laminate structure having a composition as described above is provided at a block 52. It will be appreciated that the fiber-metal-laminate structure may be in the form of a sheet or may be in the form of a structure having a complex geometry.

Referring now to FIGS. 2 and 3, at a block 53 shot intensity is determined. The shot intensity is selected to create the peened region 40 in the outer-most metallic laminate layers 24 and 25 without disrupting any interior layers, including any of the bond layers 42 or the fiber laminate layers 30, as discussed above. The shot intensity is suitably selected from the range of about 0.004 to about 0.020 on the Almen A-scale of intensity standards. However, as described above, other shot intensities may be selected as desired for a particular application.

At a decision block 54, a determination is made regarding extent of the peening that is to be performed. That is, a determination is made whether to peen the entire surface of the fiber laminate structure 22 or only specific regions, such as higher-stress regions, of structures having complex geometry.

When a determination is made to peen the entire surface of the fiber-metal-laminate structure 22, at a block 56 the entire surface of the fiber laminate structure 22 or a substantial portion thereof is peened as described above. It will be appreciated that at the block 56 the outer metallic laminate layers 24 and 25 may be peened simultaneously or sequentially, as desired or as determined by the shot device 38. The method 50 ends at a block 58.

When a determination is made to peen only specific regions of the fiber laminate structure 22, at a block 60 the specific regions of the fiber laminate structure 22 are peened. It will likewise be appreciated that at the block 58 the outer metallic laminate layers 24 and 25 may be peened simultaneously or sequentially, as desired or as determined by the shot device 38. The method 50 then proceeds to the block 58 and ends.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for altering residual stresses in a fiber-metal-laminate structure, the method comprising:
    providing at least a first fiber laminate substrate layer having a first surface and a second surface;
    providing at least a first outer metallic laminate layer having a third surface and a fourth surface;
    preparing at least one of the first and fourth surfaces with a sol-gel surface treatment;
    bonding together the first and fourth surfaces including providing a bond layer between the first and the fourth surfaces that includes a relatively uniform layer of a selected adhesive; and
    peening the third surface, such that the at least first fiber laminate substrate layer is subjected to residual tensile stresses and the at least first outer metallic laminate layer is subjected to residual compression stresses, wherein the third surface is peened at a predetermined peening intensity that provides a surface peening in a range of about 0.004 to about 0.020 as measured on an appropriate portion of the Almen A-Scale, and wherein peening defines a peened region that extends from the third surface into the at least first outer metallic laminate layer a finite distance that is closer to the third surface than the fourth surface.

2. The method of claim 1, further comprising:
    providing a second outer metallic laminate layer having a fifth surface and a sixth surface;

bonding together the second and fifth surfaces including providing a bond layer between the first and the fourth surfaces that includes a relatively uniform layer of a selected adhesive; and peening the sixth surface.

3. The method of claim 1, wherein peening causes the at least first outer metallic laminate layer to stretch, the at least first fiber laminate substrate layer mitigating stretching of the at least first outer metallic laminate layer such that the at least first outer metallic laminate layer is maintained in residual compression stresses.

4. The method of claim 1, wherein peening defines the peened region in substantially all of the third surface.

5. The method of claim 1, wherein peening defines the peened region in a selected section of the third surface.

6. The method of claim 1, wherein peening is performed with at least one of steel shot, glass shot, sand, ice, ceramics, plastics, metals, organic materials, and cryogens.

7. A method for altering residual stresses in a fiber-metal-laminate structure, the method comprising:

providing at least a first fiber laminate substrate layer having a first surface and a second surface;

providing a first outer metallic laminate layer having a third surface and a fourth surface;

providing a second outer metallic layer laminate layer having a fifth surface and a sixth surface;

preparing at least one of the first and fourth and the second and fifth surfaces with a sol-gel surface treatment;

bonding together the first and fourth surfaces by providing a bond layer between the first and the fourth surfaces that includes a relatively uniform layer of a selected adhesive;

bonding together the second and fifth surfaces including providing a bond layer between the second and the fifth surfaces that includes a relatively uniform layer of a selected adhesive;

selecting a predetermined intensity for peening; and peening the third and sixth surfaces, such that the at least first fiber laminate substrate layer is subjected to residual tensile stresses and the first and second outer metallic laminate layers are subjected to residual compression stresses, and wherein the selected peening intensity is in a range of about 0.004 to about 0.020 as measured on an appropriate portion of the Almen A-Scale, and wherein peening defines a peened region that extends from the third surface into the at least first outer metallic laminate layer a finite distance that is closer to the third surface than the fourth surface.

8. The method of claim 7, wherein peening causes the first and second outer metallic laminate layers to stretch, the at least first fiber laminate substrate layer mitigating stretching of the first and second outer metallic laminate layers such that the first and second outer metallic laminate layers are maintained in residual compression stresses.

9. The method of claim 7, wherein peening further defines a second peened region that extends into the second outer metallic laminate layer a second finite distance that is closer to the sixth surface than the fifth surface.

10. The method of claim 9, wherein peening defines the first and second peened regions in substantially all of the third and sixth surfaces, respectively.

11. The method of claim 9, wherein peening defines the first and second peened regions in a selected section of each of the third and sixth surfaces, respectively.

12. The method of claim 7, wherein peening is preformed with at least one of steel shot, glass shot, sand, ice, ceramics, plastics, metals, organic materials, and cryogens.

* * * * *